(12) United States Patent
Inoue

(10) Patent No.: US 10,983,929 B2
(45) Date of Patent: Apr. 20, 2021

(54) INFORMATION PROCESSING DEVICE

(71) Applicant: Panasonic Intellectual Property Management Co., Ltd., Osaka (JP)

(72) Inventor: Shinji Inoue, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/584,487

(22) Filed: Sep. 26, 2019

(65) Prior Publication Data
US 2020/0026670 A1 Jan. 23, 2020

Related U.S. Application Data

(63) Continuation of application No. PCT/JP2018/014480, filed on Apr. 4, 2018.

(30) Foreign Application Priority Data

Apr. 7, 2017 (JP) .............................. JP2017-076863

(51) Int. Cl.
*G06F 13/16* (2006.01)
*G06F 13/42* (2006.01)

(52) U.S. Cl.
CPC ...... *G06F 13/1668* (2013.01); *G06F 13/4282* (2013.01); *G06F 2213/0026* (2013.01)

(58) Field of Classification Search
CPC ............. G06F 13/1668; G06F 13/4282; G06F 2213/0026
See application file for complete search history.

(56) References Cited

U.S. PATENT DOCUMENTS

| | | | |
|---|---|---|---|
| 2005/0066108 A1* | 3/2005 | Zimmer | G06F 12/0223 711/1 |
| 2008/0209099 A1* | 8/2008 | Kloeppner | G06F 13/4022 710/314 |

(Continued)

FOREIGN PATENT DOCUMENTS

| | | |
|---|---|---|
| JP | 2013-045236 A | 3/2013 |
| JP | 2013-088879 A | 5/2013 |

(Continued)

*Primary Examiner* — Henry Tsai
*Assistant Examiner* — John B Roche
(74) *Attorney, Agent, or Firm* — McDermott Will & Emery LLP

(57) ABSTRACT

In an information processing device serving as a PCIe system including a host device and a plurality of memory devices, one of the plurality of memory devices is defined as a master memory. The other memory devices are defined as slave memories, and are logically coupled to the master memory. The plurality of memory devices thus constitute a single virtual storage. When accessing is performed from a root complex to the plurality of memory devices constituting the single virtual storage, the root complex hands over a bus master to the master memory. The master memory receives a command regarding the accessing from the root complex, changes address information used for the accessing in the command regarding the accessing, based on a logical relationship with the slave memories, and sends changed command regarding the accessing to the slave memories.

4 Claims, 11 Drawing Sheets

(56) References Cited

U.S. PATENT DOCUMENTS

2008/0307161 A1* 12/2008 Wei .................. G06F 3/0617
                                                  711/114
2013/0054867 A1    2/2013  Nishita
2017/0192919 A1    7/2017  Ono et al.

FOREIGN PATENT DOCUMENTS

| JP | 2014-002545 A | 1/2014 |
| JP | 2015-536496 A | 12/2015 |
| JP | 2017-123156 A | 7/2017 |
| WO | 2014/066987 A1 | 5/2014 |

* cited by examiner

FIG. 4

- EXAMPLE OF INFORMATION TO BE STORED IN FIRST INFORMATION STORAGE UNIT

MASTER

| BUS NUMBER | DEVICE NUMBER | SIZE |
|---|---|---|
| 1 | 11 | 32GB |

| | BUS NUMBER | DEVICE NUMBER | SIZE | Master |
|---|---|---|---|---|
| | 1 | 11 | 128GB | ○ (MASTER) |
| | NUMBER OF SLAVES | 2 | | |
| Slave1 (SLAVE 1) | BUS NUMBER | 1 | DEVICE NUMBER | 12 |
| | START ADDRESS | 32GB+1 | END ADDRESS | 32GB+32GB |
| Slave2 (SLAVE 2) | BUS NUMBER | 1 | DEVICE NUMBER | 13 |
| | START ADDRESS | 32GB+32GB+1 | END ADDRESS | 32GB+32GB+64GB |

FIG. 6

(1) EXAMPLE OF INFORMATION TO BE STORED IN SECOND INFORMATION STORAGE UNIT

SLAVE 1

| BUS NUMBER | DEVICE NUMBER | SIZE | MASTER | |
|---|---|---|---|---|
| | | | BUS NUMBER | DEVICE NUMBER |
| 1 | 12 | 32GB | 1 | 11 |

(2) EXAMPLE OF INFORMATION TO BE STORED IN THIRD INFORMATION STORAGE UNIT

SLAVE 2

| BUS NUMBER | DEVICE NUMBER | SIZE | MASTER | |
|---|---|---|---|---|
| | | | BUS NUMBER | DEVICE NUMBER |
| 1 | 13 | 64GB | 1 | 11 |

FIG. 7

(1) BUS INFORMATION

| NUMBER OF END PORTS | BUS MASTERING | COMMAND BUFFER |
|---|---|---|
| 1 | On | COMMAND STORAGE UNIT IMMEDIATELY AFTER BUS MASTER IS CHANGED |

(2) PORT INFORMATION (2-1) AFTER INITIALIZATION

PortA

| BUS NUMBER | DEVICE NUMBER | NUMBER OF END POINTS | Memory/IO | IO Type | 3 | Master/Slave |
|---|---|---|---|---|---|---|
| 1 | 11 | | Memory | | | ON |
| 1 | 12 | | Memory | | | Off |
| 1 | 13 | | Memory | | | Off |

(2-2) AFTER Config

| | BUS NUMBER | DEVICE NUMBER | CAPACITY | PERFORMANCE |
|---|---|---|---|---|
| Master2 | 1 | 11 | 32 | High |
| Slave1 | 1 | 12 | 32 | Middle |
| Slave2 | 1 | 13 | 64 | Middle |

FIG. 8

(1) EXAMPLE OF FORMAT FOR COMMAND PACKET

| DESTINATION | | SENDER | | FUNCTION |
|---|---|---|---|---|
| BUS NUMBER | DEVICE NUMBER | BUS NUMBER | DEVICE NUMBER | |
| START ADDRESS | | | | LENGTH OF PAYLOAD |
| PAYLOAD (FOR SENDING AND RECEIVING DATA) | | | | |

(2-1) EXAMPLE OF COMMAND PACKET (FROM MASTER 1 TO MASTER 2)

| DESTINATION | | SENDER | | FUNCTION |
|---|---|---|---|---|
| 1 | 11 | 0 | 0 | 0x4500 |
| 0x300 | | | | |
| Data | | | | |

(2-2) EXAMPLE OF COMMAND PACKET (FROM MASTER 2 TO SLAVE 1)

| DESTINATION | | SENDER | | FUNCTION |
|---|---|---|---|---|
| 1 | 12 | 1 | 11 | yyy |
| xxx | | | | |
| Data | | | | |

(2-3) EXAMPLE OF COMMAND PACKET (FROM MASTER 2 TO SLAVE 2)

| DESTINATION | | SENDER | | FUNCTION |
|---|---|---|---|---|
| 1 | 13 | 1 | 11 | qqq |
| zzz | | | | |
| Data | | | | |

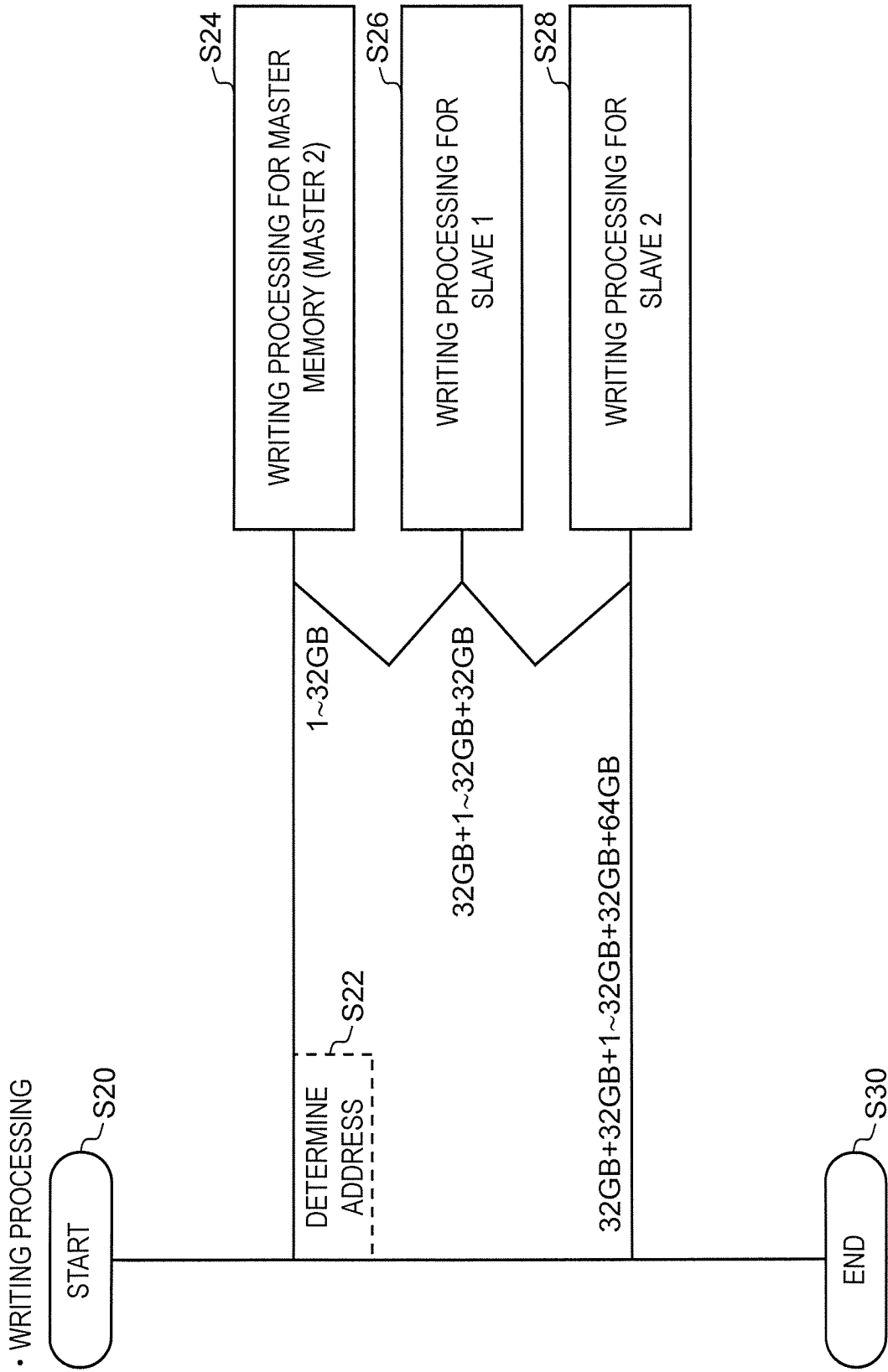

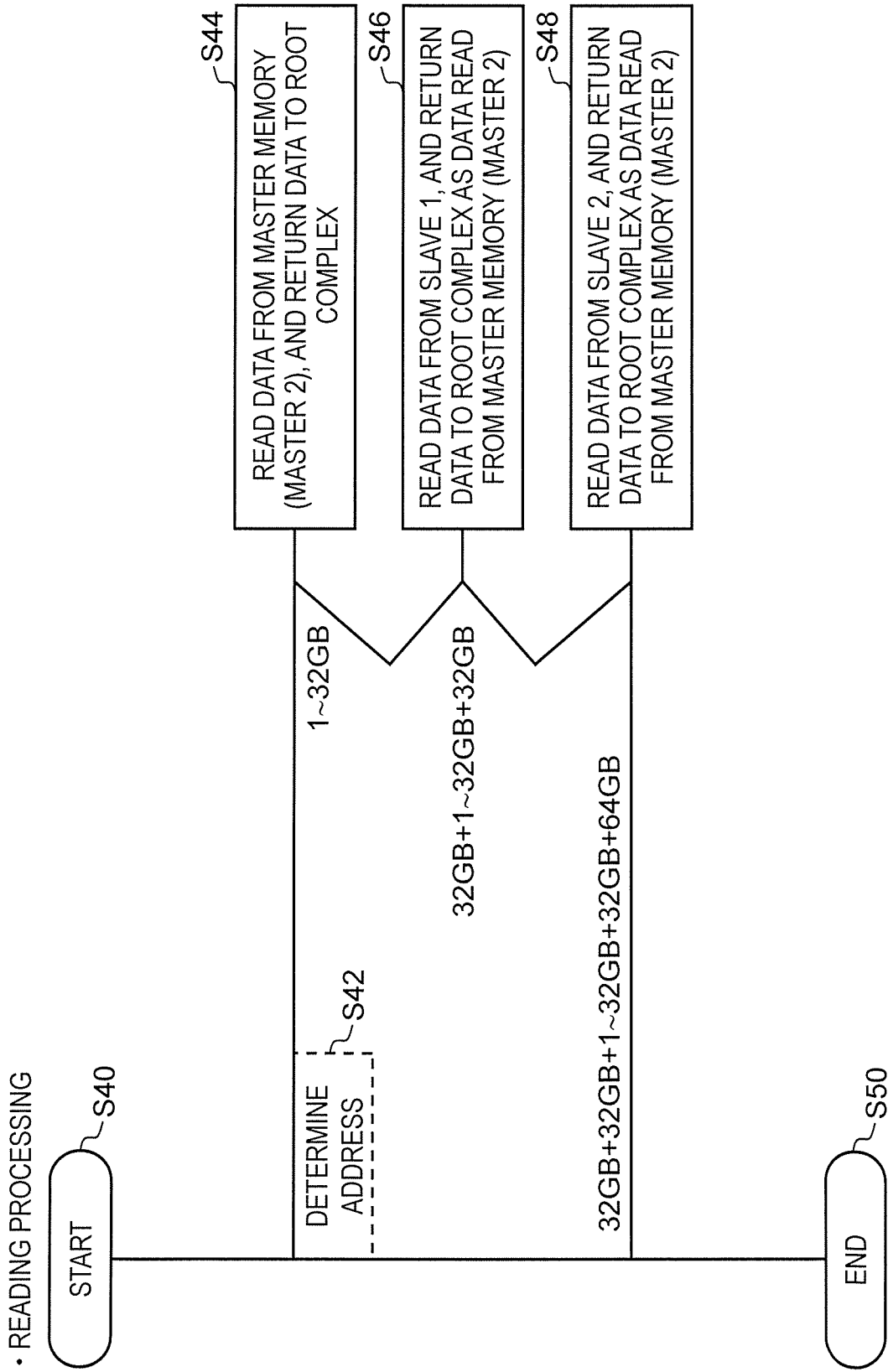

ns a Continuation of International Application No. PCT/JP2018/014480 filed on Apr. 4, 2018, which claims priority to Japanese Patent Application No. 2017-076863 filed Apr. 7, 2017. The entire disclosures of these applications are incorporated by reference herein.

INFORMATION PROCESSING DEVICE

CROSS-REFERENCE TO RELATED APPLICATIONS

This application is a Continuation of International Application No. PCT/JP2018/014480 filed on Apr. 4, 2018, which claims priority to Japanese Patent Application No. 2017-076863 filed Apr. 7, 2017. The entire disclosures of these applications are incorporated by reference herein.

TECHNICAL FIELD

The present disclosure relates to an information processing device configured to allow data to be transferred between a host device and a memory device.

BACKGROUND ART

As a high-speed serial interface, Peripheral Component Interconnect (PCI) Express (registered trademark: hereinafter will be referred to as PCIe) has been used in various electronic devices such as personal computers.

For example, PCIe is also used in a system configuration where a video server serves as a host device and a memory card serves as a memory device.

CITATION LIST

Patent Literature

PTL 1: Unexamined Japanese Patent Publication No. 2014-2545
PTL 2: Unexamined Japanese Patent Publication No. 2013-45236
PTL 3: Unexamined Japanese Patent Publication No. 2013-88879

SUMMARY

The present disclosure provides an information processing device where a plurality of memory devices constitute a single virtual large-capacity storage.

The information processing device according to the present disclosure is an information processing device serving as a PCIe system including a host device and a plurality of memory devices. The host device includes a root complex. The plurality of memory devices respectively correspond to end points. One of the plurality of memory devices described above is defined as a master memory. The other memory devices are defined as slave memories, and logically coupled to the master memory. The plurality of memory devices thus constitute a virtual storage. When accessing is performed from the root complex to the plurality of memory devices constituting the single virtual storage, the root complex hands over a bus master to the master memory. The master memory receives a command regarding the accessing from the root complex, changes address information used for the accessing in the command regarding the accessing, based on a logical relationship with the slave memories, and sends changed command regarding the accessing to a part or all of the slave memories.

The information processing device according to the present disclosure can utilize the single virtual large-capacity storage configured based on the plurality of memory devices to collectively handle large-sized data such as image data recorded for a long period of time.

BRIEF DESCRIPTION OF DRAWINGS

FIG. 4 is a view illustrating an example of information to be stored in an information storage unit of a master memory in the information processing device according to the first exemplary embodiment.

FIG. 6 is a view illustrating an example of information to be stored in an information storage unit of a slave memory in the information processing device according to the first exemplary embodiment.

FIG. 7 is a view illustrating an example of information to be stored in an information storage unit of a root complex in the information processing device according to the first exemplary embodiment.

FIG. 8 is a view illustrating an example of a format for a command packet (part (1) of FIG. 8) and examples of data of command packets (parts (2-1) to (2-3) of FIG. 8).

FIG. 9 is a flowchart of writing processing in the information processing device according to the first exemplary embodiment.

FIG. 10 is a flowchart of reading processing in the information processing device according to the first exemplary embodiment.

DESCRIPTION OF EMBODIMENTS

Figure 1:
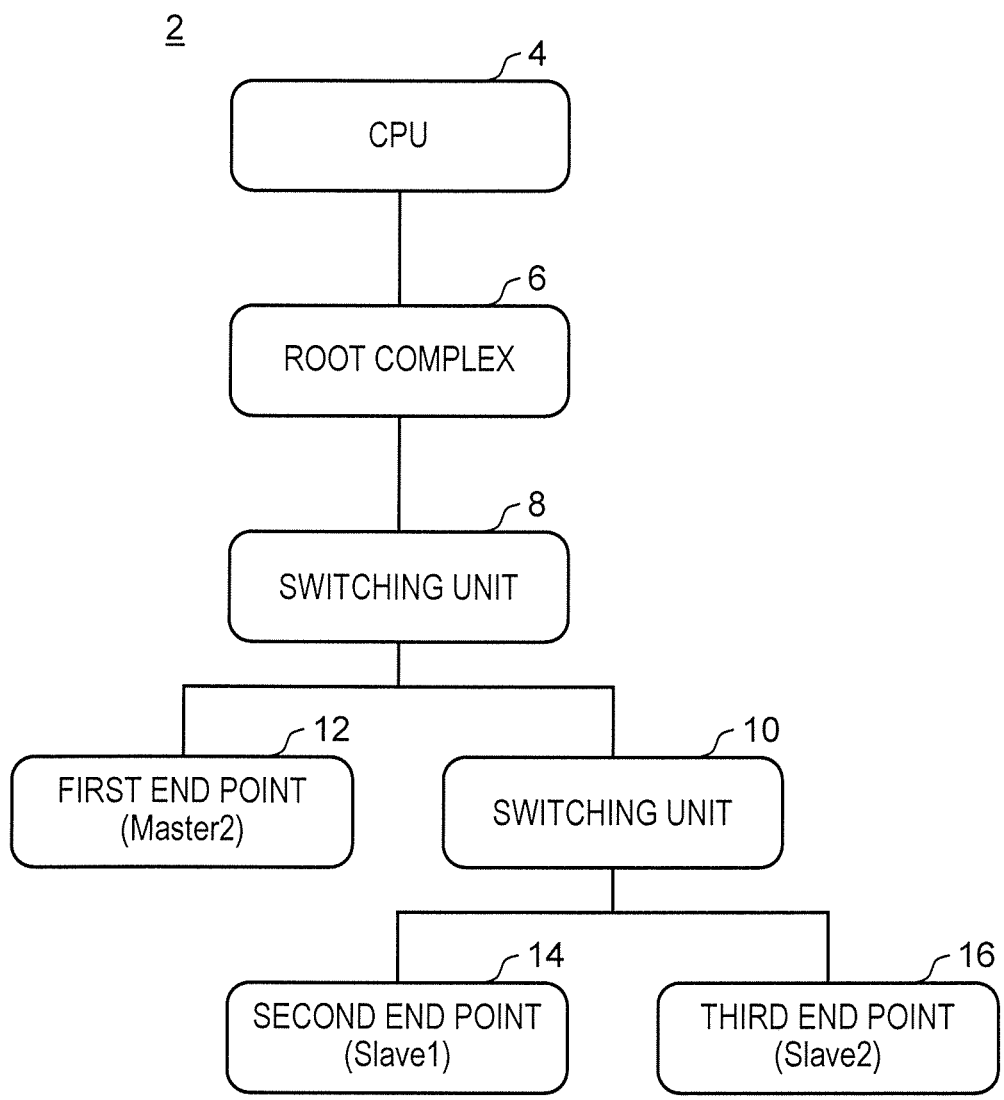
FIG. 1 is a system tree configuration diagram of an information processing device according to a first exemplary embodiment.

Exemplary embodiments will be described in detail below with reference to the drawings as appropriate. However, detailed description more than necessary may be omitted. For example, detailed description of well-known matters and redundant description of structures that are substantially the same may be omitted. This is to avoid unnecessary redundancy in the description below and to make the description easily understandable to those skilled in the art.

Note that the inventors of the present disclosure provide the accompanying drawings and the following description in order to allow those skilled in the art to fully understand the present disclosure, and do not intend to limit the subject matter as described in the appended claims.

1. Details of Exemplary Embodiments

In a system that uses PCIe, a root complex having a host function serves as a highest device. Furthermore, local devices are coupled in a point-to-point, tree shape. One PCIe device tree is coupled with only one root complex.

With switching units provided in a PCIe bus coupling formed based on a point-to-point coupling constituting a basic aspect, as described above, a plurality of devices (e.g., memory cards) serving as end points can be coupled. In a case where devices to be coupled as end points are memory devices (e.g., secure digital (SD) cards (registered trademark)), a root complex coupled to a central processing unit (CPU) of a host device identifies the devices as the plurality of memory devices, and accesses each of the devices as an individual memory device (e.g., to perform writing processing and reading processing).

When a video server that uses PCIe tries to record large-sized image data in a memory device, such image data having a capacity exceeding a capacity of a single memory card has not been recorded as a single file. That is, the video server has to divide large-sized image data into a plurality of pieces of data to record the divided pieces of data in the memory devices.

When image data recorded for a long period of time is allowed to undergo processing, on the other hand, it has been required that large-sized image data be collectively handled (e.g., as a single file).

In view of the issues described above, the exemplary embodiment relates to an information processing device serving as a PCIe system including a host device and a plurality of memory devices. The host device includes a root complex. The plurality of memory devices respectively correspond to end points. One of the plurality of memory devices described above is defined as a master memory. The other memory devices are defined as slave memories, and logically coupled to the master memory. The plurality of memory devices thus constitute a virtual storage.

When accessing (e.g., writing processing and reading processing) is performed from the root complex to the plurality of memory devices constituting the single virtual storage, the root complex hands over a bus master to the master memory. The master memory handed over with the bus master and received with a command regarding the accessing from the root complex changes, in the command regarding the accessing, address information used for the accessing, based on a logical relationship with the slave memories, and sends the changed command regarding the accessing to a part or all of the slave memories.

In the information processing device where the plurality of memory devices constitute a single virtual large-capacity storage, as described above, large-sized data such as image data recorded for a long period of time is to be collectively handled.

2. [First Exemplary Embodiment]

A first exemplary embodiment will now be described herein with reference to FIGS. 1 to 11.

2.1. Configuration of Information Processing Device

FIG. 1 is a system tree configuration diagram of information processing device 2 according to the first exemplary embodiment.

Information processing device 2 includes CPU 4, root complex 6, and two switching units 8, 10.

CPU 4 and root complex 6 are coupled, via switching unit 8, to first memory device 12 serving as a first end point. CPU 4 and root complex 6 are further coupled, via switching unit 8 and switching unit 10, second memory device 14 serving as a second end point and third memory device 16 serving as a third end point.

As will be described later, as a bus master is handed over from root complex 6 to first memory device 12, first memory device 12 (first end point) serves as a master memory. Meanwhile, second and third memory devices 14, 16 (second end point and third end point) serve as slave memories with respect to the master memory. Such designations are illustrated in parentheses, such as (Master 2), (Slave 1), and (Slave 2).

The present disclosure is not however limited to such a configuration that, in the system tree configuration according to the first exemplary embodiment illustrated in FIG. 1, first memory device 12 only serves as a master memory. The present disclosure is not similarly limited to such a configuration that second memory device 14 and third memory device 16 serve as slave memories.

In information processing device 2 illustrated in FIG. 1, three memory devices are coupled. However, a number of coupled memory devices may be two or four or more.

Figure 2:
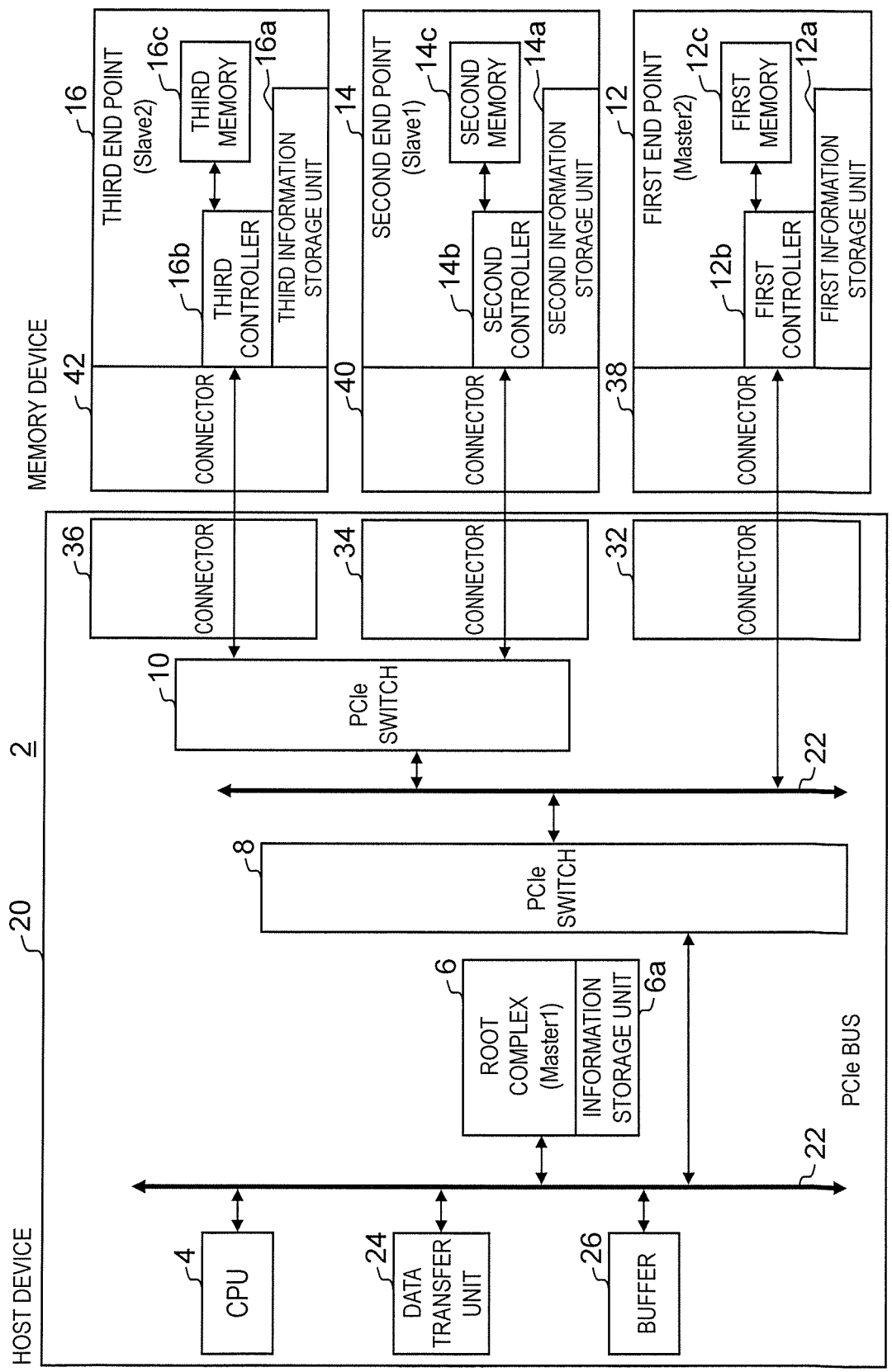
FIG. 2 is a detailed block diagram of the information processing device according to the first exemplary embodiment.

FIG. 2 is a detailed block diagram of information processing device 2 according to the first exemplary embodiment.

Information processing device 2 illustrated in FIG. 2 includes host device 20, and memory devices (12, 14, and 16) coupled, via connectors (32 and 38, 34 and 40, and 36 and 42), to host device 20. Memory devices (12, 14, and 16) are recording media such as memory cards.

As described above, the number of memory devices coupled to host device 20 may be two or four or more.

In host device 20 illustrated in FIG. 2, CPU 4, data transfer unit 24, buffer 26, and root complex 6 are coupled with each other via PCIe bus 22. Root complex 6 is a device serving as a route of the tree of PCIe, and includes information storage unit 6a.

Furthermore, as connector 32 of host device 20 and connector 38 of first memory device 12 are coupled with each other, root complex 6 is coupled with first memory device 12 via PCIe switch 8 and PCIe bus 22.

As connector 34 of host device 20 and connector 40 of second memory device 14 are coupled with each other, root complex 6 is similarly coupled with second memory device 14 via PCIe switch 8, PCIe switch 10, and PCIe bus 22. As connector 36 of host device 20 and connector 42 of third memory device 16 are coupled with each other, root complex 6 is coupled with third memory device 16 via PCIe switch 8, PCIe switch 10, and PCIe bus 22.

The memory devices (first memory device 12, second memory device 14, and third memory device 16) respectively include controllers (first controller 12b, second controller 14b, and third controller 16b) respectively configured to control how the memory devices operate.

First memory device 12, second memory device 14, and third memory device 16 respectively include first memory 12c, second memory 14c, and third memory 16c.

First memory 12c, second memory 14c, and third memory 16c respectively serve as storages configured to store data. First memory device 12, second memory device 14, and third memory device 16 respectively further include first information storage unit 12a, second information storage unit 14a, and third information storage unit 16a. First information storage unit 12a, second information storage unit 14a, and third information storage unit 16a respectively store, as will be described later in detail, for example, information regarding whether each (each of the memory devices) is provided with a function to be able to be served as a master memory, information regarding capacity, and information regarding performance (see FIGS. 4 and 6, for example).

First to third information storage units 12a, 14a, and 16a may be respectively achieved by using first to third memories 12c, 14c, and 16c, or may be achieved by using other devices (e.g., registers). In a case where the first to third information storage units are respectively achieved by using first to third memories 12c, 14c, and 16c, the first to third information storage units are respectively regarded as portions that are not included in storages to be accessed by the information processing device according to the first exemplary embodiment. That is, the portions are regions respectively separately managed by first to third controllers 12b, 14b, 16b, as well as are regions from which no information disappears even when format processing is performed.

As also illustrated in FIG. 1, first memory device 12, second memory device 14, and third memory device 16 respectively correspond to the first end point, the second end point, and the third end point with respect to root complex 6 in the tree configuration of PCIe.

Figure 11:
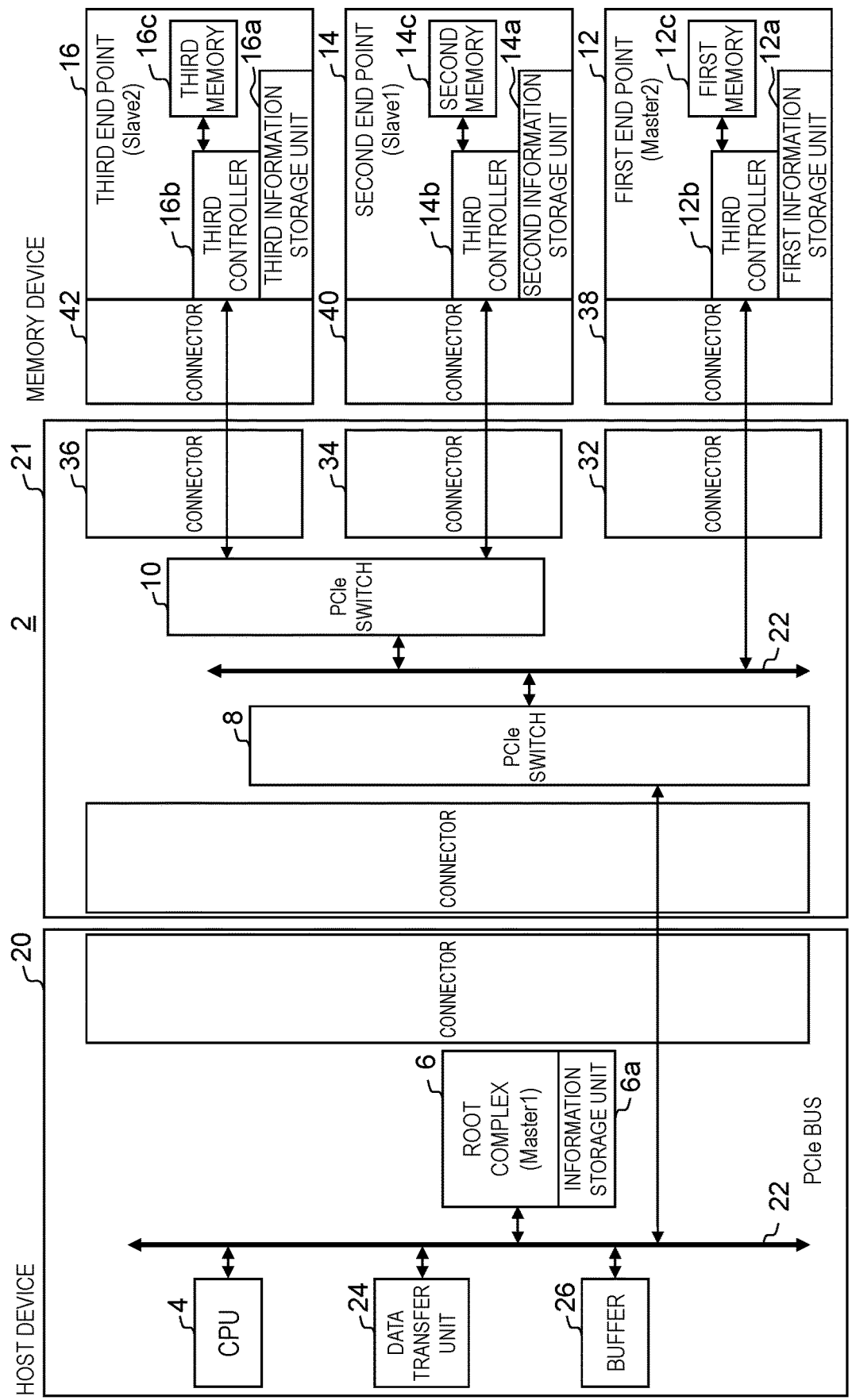
FIG. 11 is a detailed block diagram of an information processing device according to a modification example to the first exemplary embodiment.

FIG. 11 is a detailed block diagram of an information processing device according to a modification example to the first exemplary embodiment. In the information processing device illustrated in FIG. 11, switch connector 21 including PCIe switches 8, 10 and PCIe bus 22 is interposed between host device 20 and memory devices 12, 14, and 16. The information processing device according to the modification example as described above can achieve the first exemplary embodiment.

2.2. Operation of Information Processing Device

Figure 3:
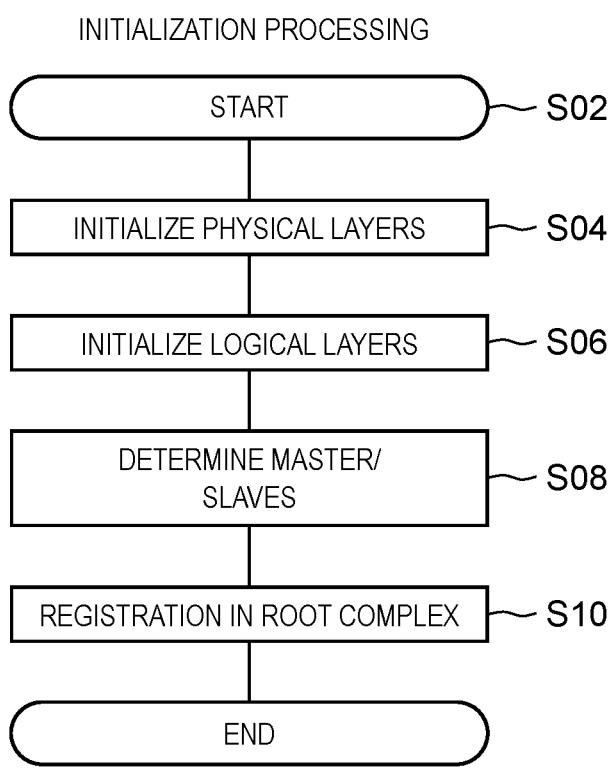
FIG. 3 is a flowchart of initialization processing for a large-capacity storage of the information processing device according to the first exemplary embodiment.

FIG. 3 is a flowchart of initialization processing for the virtual large-capacity storage, which is performed by the information processing device according to the first exemplary embodiment. Furthermore, FIG. 9 is a flowchart of writing processing for the virtual large-capacity storage, which is performed by the information processing device according to the first exemplary embodiment. FIG. 10 is a flowchart of reading processing for the virtual large-capacity storage, which is performed by the information processing device according to the first exemplary embodiment.

In the first exemplary embodiment, one of the three memory devices is defined as a master memory in the information processing device that includes the host device and the three memory devices, and that is illustrated as an example of a PCIe system configuration. Furthermore, the other two memory devices are defined as slave memories, and simultaneously logically coupled to the master memory. Here will describe, with reference to FIGS. 3 to 10, the initialization processing, as well as the writing processing and the reading processing, after the bus master is handed over in the first exemplary embodiment as described above.

2.2.1. Initialization Processing

After the initialization processing illustrated in FIG. 3 has started (step S02), host device 20 initializes physical layers (step S04), as well as initializes logical layers (step S06) of the three memory devices coupled, via the connectors, to host device 20. Host device 20 then designates one of the three memory devices as a master memory and the rest as slave memories (step S08).

The step of designating one of the memory devices as a master memory and the rest as slave memories basically proceeds in such a manner that, when at least one memory device has a function to be able to be served as a master memory, host device 20 selects the one (host device 20 selects one of a plurality of such memory devices, if any). For example, more specifically, the step follows a policy described below.

[1] In a case where one of a plurality of memory devices has a function to be able to be served as a master memory, host device 20 selects the one as the master memory.

[2] In a case where some of a plurality of memory devices each have a function to be able to be served as a master memory, host device 20 selects one as the master memory.

[3] Host device 20 may determine beforehand one, which is to be attached with a memory device to be served as a master memory, of a plurality of connectors (slots) 32, 34, and 36 that are provided to host device 20 and that are to be coupled to a plurality of memory devices.

[4] Such a policy may be applied that host device 20 sets an order of priority beforehand for a plurality of connectors (slots) 32, 34, 36 that are to be coupled to a plurality of memory devices and that are provided to host device 20, and, when the memory devices are attached, host device 20 selects, as a master memory, one of the memory devices (slots), because the one is attached to a higher-priority one of the connectors.

[5] Host device 20 may determine a master memory and slave memories in accordance with data input from an input device.

In the initialization processing illustrated in FIG. 3, host device 20 then registers (stores) information regarding the memory devices (see parts (2-1), (2-2) in FIG. 7) in information storage unit 6a of root complex 6 (step S10). The information regarding the memory devices (parts (2-1), (2-2) in FIG. 7) will be described later.

FIG. 4 is a view illustrating an example of information to be stored in first information storage unit 12a of first memory device 12 corresponding to the first end point at end of the initialization processing in FIG. 3.

In the example of the information to be stored in first information storage unit 12a, as illustrated in FIG. 4, information regarding first memory device 12 itself (Bus number: 1, Device number: 11, and Size: 32 GB) is first recorded.

Next, in the example of the information to be stored in first information storage unit 12a, as illustrated in FIG. 4, information regarding a logical relationship between the master memory and the slave memories in the virtual large-capacity storage including one master memory (first memory device 12) and two slave memories (second memory device 14 and third memory device 16) is stored.

That is, it is recorded that a device having the bus number of "1" and the device number of "11" (i.e., first memory device 12 itself) serves as the master to constitute a storage having a size of "128 GB". It is then recorded that the "two" slave memories are included. It is further recorded that the two slave memories are "Slave 1" and "Slave 2". It is further recorded that a device having a bus number of "1" and a device number of "12", i.e., "Slave 1", is a memory occupying a region ranging from a start address of "32 GB+1 B" to an end address of "32 GB+32 GB" in the large-capacity storage. It is further recorded that a device having a bus number of "1" and a device number of "13", i.e., "Slave 2", is a memory occupying a region ranging from a start address of "32 GB+32 GB+1 B" to an end address of "32 GB+32 GB+64 GB" in the large-capacity storage.

Figure 5:
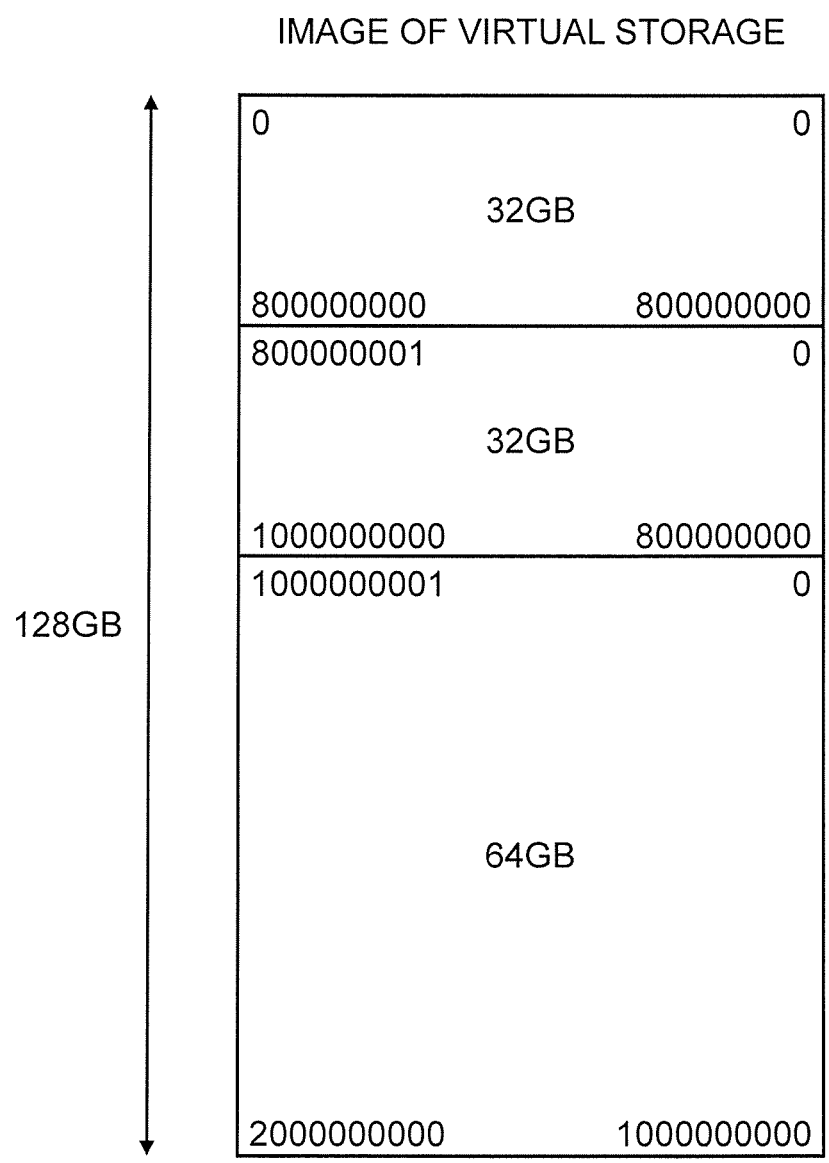
FIG. 5 is a general view of a virtual large-capacity storage in the information processing device according to the first exemplary embodiment.

FIG. 5 is a configuration diagram of the virtual large-capacity storage created and used in the information processing device illustrated in FIG. 1.

The virtual large-capacity storage illustrated in FIG. 5 is configured in accordance with contents of the example of the information stored in first information storage unit 12a illustrated in FIG. 4. First, the virtual large-capacity storage illustrated in FIG. 5 has the total capacity of 128 GB. A region ranging from a start address of "0" to the end address of "32 GB" in the capacity of 128 GB is occupied by first memory device 12 (Capacity: 32 GB) serving as the master memory. A region ranging from the start address of "32 GB+1 B" to the end address of "32 GB+32 GB" is occupied by second memory device 14 (Capacity: 32 GB) serving as slave memory "Slave 1". A region ranging from the start address of "32 GB+32 GB+1 B" to the end address of "32 GB+32 GB+64 GB" is occupied by third memory device 16 (Capacity: 64 GB) serving as slave memory "Slave 2".

As described above, the large-capacity storage having the capacity of 128 GB is achieved.

Part (1) of FIG. 6 illustrates an example of information to be stored in second information storage unit 14*a* of second memory device 14 corresponding to the second end point and serving as slave memory "Slave 1" at the end of the initialization processing in FIG. 3.

Similarly, part (2) of FIG. 6 illustrates an example of information to be stored in third information storage unit 16*a* of third memory device 16 corresponding to the third end point and serving as slave memory "Slave 2" at the end of the initialization processing in FIG. 3.

As illustrated in part (1) of FIG. 6, the example of the information to be stored in second information storage unit 14*a* of second memory device 14 is recording that the memory device having the bus number of "1" and the device number of "11" (i.e., first memory device 12) serves as the master memory, and the device having the bus number of "1", the device number of "12", and the size (capacity) of "32 GB" (i.e., second memory device 14) serves as one of the slave memories.

Similarly, as illustrated in part (2) of FIG. 6, the example of the information to be stored in third information storage unit 16*a* of third memory device 16 is recording that the memory device having the bus number of "1" and the device number of "11" (i.e., first memory device 11) serves as the master memory, and the device having the bus number of "1", the device number of "13", and the size (capacity) of "64 GB" (i.e., third memory device 16) serves as another one of the slave memories.

FIG. 7 is a view illustrating an example of information to be stored in information storage unit 6*a* of root complex 6 in host device 20. Part (2-1) of FIG. 7 illustrates port information after initialization. Part (2-2) of FIG. 7 illustrates port information after configuration settings.

The port information after the initialization in part (2-1) of FIG. 7 is recording that the bus number of "1" and the device number of "11", the bus number of "1" and the device number of "12", and the bus number of "1" and the device number of "13" all respectively represent the "memories", and the memory having the bus number of "1" and the device number of "11" is only able to serve as the master memory.

The port information after the configuration settings in part (2-2) of FIG. 7 is recording that the memory having the bus number of "1" and the device number of "11" (Master 2) and the memory having the bus number of "1" and the device number of "12" (Slave 1) each have the capacity of 32 GB, and the memory having the bus number of "1" and the device number of "13" (Slave 2) has the capacity of 64 GB. Furthermore, the port information in part (2-2) of FIG. 7 is recording that the memory having the bus number of "1" and the device number of "11" (Master 2) has "High" performance, and the memory having the bus number of "1" and the device number of "12" (Slave 1) and the memory having the bus number of "1" and the device number of "13" (Slave 2) each have "Middle" performance.

The port information after the initialization (part (2-1) of FIG. 7) and the port information after the configuration settings (part (2-2) of FIG. 7) are recorded in registration in root complex (S10) in the initialization processing illustrated in FIG. 3.

2.2.2. Command Packet

In a PCIe system, command packets are exchanged between a root complex and end points, for example.

In the information processing device according to the first exemplary embodiment, for example, a command is sent from an original master device, i.e., root complex 6 (Master 1), to the first end point (first memory device 12) (Master 2) to which a master function (bus master) is to be handed over through a bus mastering function.

In here, for example, a command is sent from Master 1 to Master 2, that is, from a side (device) that hands over a bus master to a side (device) that receives the bus master, as described below.

First, Master 1 stores, in information storage unit 6*a* (of root complex 6), a command that should be sent from root complex 6 to first memory device 12 (Master 2). At this time, Master 1 stores the command in, for example, a command buffer (a command storage unit immediately after a bus master is changed) for bus information (illustrated in part (1) of FIG. 7). Master 1 further keeps "On" bus mastering in the bus information (illustrated in part (1) of FIG. 7), and hands over the bus master (master function) to Master 2 (first memory device 12). First controller 12*b* of Master 2 (first memory device 12) handed over with the bus master starts (1) a transaction of reading "Command buffer" in the bus information in information storage unit 6*a* of Master 1 (root complex 6).

As Master 2 (first memory device 12) reads "Command buffer" (in Master 1), as described above, the command stored in Master 1 is sent from Master 1 to Master 2.

Part (1) of FIG. 8 illustrates an example of a format for a command packet. The example of the format, illustrated in part (1) of FIG. 8, includes Destination (Bus number and Device number), Sender (Bus number and Device number), Function, Start address, Length of payload, and Payload (for sending and receiving data). In here, Function is indicative of a specific operation and a specific function of a command, and is stored with a code indicative of writing or reading, for example.

Part (2-1) of FIG. 8 is an example of data of a command packet to be sent from Master 1 to Master 2.

"Destination" is stored with data (Bus number: 1 and Device number: 11) indicative of the first end point (first memory device 12). "Sender" is stored with data (Bus number: 0 and Device number: 0) indicative of root complex 6. "Start address" is stored with "0x300" (as an example). "Length of payload" is stored with "0x4500" (as an example). "Start address" is designated with an address on the virtual large-capacity storage including first memory device 12, second memory device 14, and third memory device 16 illustrated in FIG. 5.

Part (2-2) of FIG. 8 is an example of data of a command packet to be sent from Master 2 to Slave 1.

As described above, first memory device 12 (Master 2) handed over with the bus master from root complex 6 (Mater 1) and received the command performs rewriting for "Start address" with, instead of an address on the virtual large-capacity storage, an address in second memory device 14 (Slave 1), and stores the rewritten address in "Start address" (i.e., the address is changed based on the logical relationship between the master memory and the slave memories). "Destination" is stored with data (Bus number: 1 and Device number: 12) indicative of the second end point (second memory device 14). "Sender" is stored with data (Bus number: 1 and Device number: 11) indicative of the first end point (first memory device 12).

Similarly, part (2-3) of FIG. 8 is an example of data of a command packet to be sent from Master 2 to Slave 2.

As described above, first memory device 12 (Master 2) handed over with the bus master from root complex 6 (Mater 1) and received the command performs rewriting for "Start address" with, instead of an address on the virtual large-capacity storage, an address in third memory device 16 (Slave 2), and stores the rewritten address in "Start address" (i.e., the address is changed based on the logical relationship between the master memory and the slave memories). "Destination" is stored with data (Bus number: 1 and Device number: 13) indicative of the third end point (third memory device 16). "Sender" is stored with data (Bus number: 1 and Device number: 11) indicative of the first end point (first memory device 12).

2.2.3. Writing Processing

FIG. 9 is a schematic flowchart of writing processing for the virtual large-capacity storage, which is performed by the information processing device according to the first exemplary embodiment.

It is assumed in here that data is to be written onto the first to third end points (first memory device 12, second memory device 14, and third memory device 16) constituting the large-capacity storage. That is, it is assumed that a range from a start point (start address) to an end point (end address) of the writing processing extends across boundaries among the memory devices.

After the writing processing illustrated in FIG. 9 has started (S20), as described above, root complex 6 (Master 1) stores a command used for the writing processing in information storage unit 6a. Furthermore, root complex 6 (Master 1) hands over the bus master to first memory device 12 (Master 2). After handed over with the bus master, first controller 12b of first memory device 12 (Master 2) starts a transaction of reading the command that is stored in information storage unit 6a of root complex 6 (Master 1) and that is used for the writing processing to read the command used for the writing processing.

As described above, the command is sent from root complex 6 (Master 1) to first memory device 12 (Master 2). First memory device 12 (Master 2) thus receives the command.

As for the command that is received by first memory device 12 (Master 2) and that is used for the writing processing, an address regarded as a target on one of the memories in the virtual large-capacity storage is determined by first controller 12b (S22). When the address regarded as the target corresponds to one that is on first information storage unit 12a of master memory (Master 2) (e.g., falls within a range of [1 GB to 32 GB] inclusive), the writing processing is performed for the master memory (Mater 2) (first memory device 12) (S24). When the address regarded as the target corresponds to one that is on second information storage unit 14a of Slave 1 (e.g., falls within a range from [32 GB+1 B] to [32 GB+32 GB] inclusive), the writing processing is performed for Slave 1 (second memory device 14) (S26). When the address regarded as the target corresponds to one that is on third information storage unit 16a of Slave 2 (e.g., falls within a range from [32 GB+32 GB+1 B] to [32 GB+32 GB+64 GB]inclusive), the writing processing is performed for Slave 2 (third memory device 16) (S28). After all payload data has been written, the writing processing ends (S30).

In here, the writing processing for Slave 1 (second memory device 14) is executed by, as illustrated in part (2-2) of FIG. 8, a command to be sent from first memory device 12 (Master 2) serving as the master memory to Slave 1.

Similarly, the writing processing for Slave 2 (third memory device 16) is executed by, as illustrated in part (2-3) of FIG. 8, a command to be sent from first memory device 12 (Master 2) serving as the master memory to Slave 2.

Therefore, in a case where a region from a start point (start address) to an end point (end address) of the writing processing to be performed ranges across a boundary between two of the memory devices, for example, across a boundary between first memory device 12 (Master 2) and second memory device 14 (Slave 1), the master memory issues in a divided manner a command to be sent from Master 2 to Slave 1 (see part (2-2) of FIG. 8). At this time, "Start address" is regarded as one that is on second memory device 14 (Slave 1) (i.e., 32 GB is subtracted from "32 GB+1 B"). "Length of payload" is regarded as one that is obtained by subtracting a length from a start address to a terminal address in Master 2 from an original length of a payload. "Payload" is stored with one obtained by subtracting, from a top of the original payload, data to be written from the start address to the terminal address in Master 2. First memory device 12 (Master 2) only receives (i.e., performs writing for the address without dividing a command) a part, which is directed to first memory device 12 (Master 2) itself (i.e., an address is directed to Master 2 itself), of the command that is received by first memory device 12 (Master 2) and that is used for the writing processing. However, only data having a length from its start address to its terminal address is to be written from the top of the original payload.

In a case where a region from a start point (start address) to an end point (end address) of the writing processing to be performed ranges across another boundary between the other memory devices, for example, across a boundary between second memory device 14 (Slave 1) and third memory device 16 (Slave 2), the master memory issues in a divided manner a command to be sent from Master 2 to Slave 1 (see part (2-2) of FIG. 8) and a command to be sent from Master 2 to Slave 2 (see part (2-3) of FIG. 8). In the command to be sent from Master 2 to Slave 1, "Start address" is regarded as one that is on second memory device 14 (Slave 1) (i.e., 32 GB is subtracted from "32 GB+1 B to 32 GB+32 GB"). "Length of payload" is regarded as a length from a start address to a terminal address in Slave 1. "Payload" is stored with, from a top of an original payload, data having the length from the start address to the terminal address in Slave 1.

In the command to be sent from Master 2 to Slave 2, "Start address" is regarded as one that is on third memory device 16 (Slave 2) (i.e., (32 GB+32 GB) is subtracted from "32 GB+32 GB+1 B"). "Length of payload" is regarded as one that is obtained by subtracting, from the original length of the payload, a length from the start address to the terminal address in Slave 1. "Payload" is stored with, from the top of the original payload, one that is obtained by subtracting data to be written from the start address to the terminal address in Slave 1.

In a case where a region from a start point (start address) to an end point (end address) of the writing processing to be performed ranges across two boundaries among the memory devices, that is, across the boundary between first memory device 12 (Master 2) and second memory device 14 (Slave 1) and the boundary between second memory device 14 (Slave 1) and third memory device 16 (Slave 2), the master memory issues in a divided manner a command to be sent from Master 2 to Slave 1 (see part (2-2) of FIG. 8) and a command to be sent from Master 2 to Slave 2 (see part (2-3) of FIG. 8).

In the command to be sent from Master 2 to Slave 1, "Start address" is regarded as one that is on second memory device 14 (Slave 1) (i.e., 32 GB is subtracted from "32 GB+1 B"). "Length of payload" is regarded as a length from its start address to its terminal address (i.e., 32 GB). "Payload" is stored with, in data obtained by subtracting data to be written from a start address to a terminal address in Master 2 from the top of the original payload, data equivalent to an amount of 32 GB (i.e., a length from its start address to its terminal address) counted from the top.

In the command to be sent from Master 2 to Slave 2, "Start address" is regarded as one that is on third memory device 16 (Slave 2) (i.e., (32 GB+32 GB) is subtracted from "32 GB+32 GB+1 B"). "Length of payload" is regarded as one that is obtained by subtracting, from the original length of the payload, the length from the start address to the terminal address in Master 2 and the length from the start address to the terminal address in Slave 1 (i.e., 32 GB). "Payload" is stored with data obtained by subtracting, from the top of the original payload, data to be written from the start address to the terminal address in Master 2 and data to be written from the start address to the terminal address in Slave 1 (i.e., data equivalent to an amount of 32 GB).

First memory device 12 (Master 2) only receives a part, which is directed to first memory device 12 (Master 2) itself (i.e., an address is directed to Master 2 itself), of the command that is received by first memory device 12 (Master 2) and that is used for the writing processing. That is, first memory device 12 (Master 2) performs writing for the address without dividing the command. However, only data having a length from its start address to its terminal address is to be written from a top of an original payload.

At end of the writing processing, first memory device 12 (Master 2) may return the bus master to root complex 6 (Master 1).

2.2.1. Reading Processing

FIG. 10 is a schematic flowchart of reading processing for the virtual large-capacity storage, which is performed by the information processing device according to the first exemplary embodiment.

It is assumed in here that data is to be read from the first to third end points (first memory device 12, second memory device 14, and third memory device 16) constituting the large-capacity storage. That is, it is assumed that a region from a start point (start address) to an end point (end address) of the reading processing extends across the boundaries of the memory devices.

After the reading processing illustrated in FIG. 9 has started (S40), as described above, root complex 6 (Master 1) stores a command used for the reading processing in information storage unit 6a. Furthermore, root complex 6 (Master 1) hands over the bus master to first memory device 12 (Master 2). After handed over with the bus master, first controller 12b of first memory device 12 (Master 2) starts a transaction of reading the command that is stored in information storage unit 6a of root complex 6 (Master 1) and that is used for the reading processing to read the command used for the reading processing. As described above, the command is sent from root complex 6 (Master 1) to first memory device 12 (Master 2). First memory device 12 (Master 2) thus receives the command.

As for the command that is received by first memory device 12 (Master 2) and that is used for the reading processing, an address regarded as the target on one of the memories in the virtual large-capacity storage is determined by first controller 12b (S42). When the address regarded as the target is one that is on first information storage unit 12a of master memory (Master 2) (e.g., falls within a range of [1 B to 32 GB] inclusive), the reading processing is performed for the master memory (Mater 2) (first memory device 12) (S44). When the address regarded as the target is one that is on second information storage unit 14a of Slave 1 (e.g., falls within a range from [32 GB+1 B] to [32 GB+32 GB] inclusive), the reading processing is performed for Slave 1 (second memory device 14) (S46). When the address regarded as the target is one that is on third information storage unit 16a of Slave 2 (e.g., falls within a range from [32 GB+32 GB+1 B] to [32 GB+32 GB+64 GB] inclusive), the reading processing is performed for Slave 2 (third memory device 16) (S48).

In here, the reading processing for Slave 1 (second memory device 14) is executed by, as illustrated in part (2-2) of FIG. 8, a command to be sent from first memory device 12 (Master 2) serving as the master memory to Slave 1. Data read from Slave 1 is stored in "Payload" in a corresponding command packet.

Furthermore, "Destination" in the command packet is stored with data indicative of root complex 6. "Sender" is stored with data indicative of the master memory (first end point, i.e., first memory device 12). "Start address" is rewritten with, instead of an address on second memory device 14 (Slave 1), an address on the virtual large-capacity storage (i.e., the address is changed based on the logical relationship between the master memory and the slave memories), and is returned to root complex 6. That is, the data read from Slave 1 is returned to root complex 6 as data read from the master memory (via the master memory).

Similarly, the reading processing for Slave 2 (third memory device 16) is executed by, as illustrated in part (2-3) of FIG. 8, a command to be sent from first memory device 12 (Master 2) serving as the master memory to Slave 2.

Data read from Slave 2 is stored in "Payload" in the corresponding command packet.

Furthermore, "Destination" in the command packet is stored with data indicative of root complex 6. "Sender" is stored with data indicative of the master memory (first end point, i.e., first memory device 12). "Start address" is rewritten with, instead of an address on third memory device 16 (Slave 2), an address on the virtual large-capacity storage (i.e., the address is changed based on the logical relationship between the master memory and the slave memories), and is returned to root complex 6. That is, the data read from Slave 2 is returned to root complex 6 as data read from the master memory (via the master memory).

Therefore, in a case where a region from a (start address) to an end point (end address) of the reading processing ranges across one or more boundaries among the memory devices, similar to the writing processing, the master memory divides a command (and issues the divided commands).

First, in a case where a region from a start point (start address) to an end point (end address) of the reading processing to be performed ranges across a boundary between two of the memory devices, for example, across the boundary between first memory device 12 (Master 2) and second memory device 14 (Slave 1), the master memory issues in a divided manner a command to be sent from Master 2 to Slave 1 (see part (2-2) of FIG. 8). At this time, "Start address" is regarded as one that is on second memory device 14 (Slave 1) (i.e., 32 GB is subtracted from "32 GB+1"). "Length of payload" is regarded as one that is obtained by subtracting, from an original length of a payload, a length from a start address to a terminal address in Master 2.

First memory device 12 (Master 2) only receives (i.e., performs reading for the address without dividing a command) a part, which is directed to first memory device 12 (Master 2) itself (i.e., the address is directed to Master 2 itself), of the command that is received by first memory device 12 (Master 2) and that is used for the reading processing. However, only reading is performed for data having a length from its start address to its terminal address.

The data read from second memory device 14 (Slave 1) is, as described above, returned to root complex 6 as data read from the master memory (via the master memory).

In a case where a region from a start point (start address) to an end point (end address) of the reading processing to be performed ranges across another boundary between the other memory devices, for example, across the boundary between second memory device 14 (Slave 1) and third memory device 16 (Slave 2), the master memory issues in a divided manner a command to be sent from Master 2 to Slave 1 (see part (2-2) of FIG. 8) and a command to be sent from Master 2 to Slave 2 (see part (2-3) of FIG. 8).

In the command to be sent from Master 2 to Slave 1, "Start address" is regarded as one that is on second memory device 14 (Slave 1) (i.e., 32 GB is subtracted from "32 GB+1 B to 32 GB+32 GB"). "Length of payload" is regarded as a length from a start address to a terminal address in Slave 1.

In the command to be sent from Master 2 to Slave 2, "Start address" is regarded as one that is on third memory device 16 (Slave 2) (i.e., (32 GB+32 GB) is subtracted from "32 GB+32 GB+1 B"). "Length of payload" is regarded as one that is obtained by subtracting, from the original length of the payload, the length from the start address to the terminal address in Slave 1.

The data read from second memory device 14 (Slave 1) is, as described above, returned to root complex 6 as data read from the master memory (via the master memory).

The data read from third memory device 16 (Slave 2) is, as described above, returned to root complex 6 as data read from the master memory (via the master memory).

In a case where a region from a start point (start address) to an end point (end address) of the reading processing to be performed ranges across the two boundaries among the memory devices, that is, across the boundary between first memory device 12 (Master 2) and second memory device 14 (Slave 1) and the boundary between second memory device 14 (Slave 1) and third memory device 16 (Slave 2), the master memory issues in a divided manner a command to be sent from Master 2 to Slave 1 (see part (2-2) of FIG. 8) and a command to be sent from Master 2 to Slave 2 (see part (2-3) of FIG. 8).

In the command to be sent from Master 2 to Slave 1, "Start address" is regarded as one that is on second memory device 14 (Slave 1) (i.e., 32 GB is subtracted from "32 GB+1 B"). "Length of payload" is regarded as a length from its start address to its terminal address (i.e., 32 GB).

In the command to be sent from Master 2 to Slave 2, "Start address" is regarded as one that is on third memory device 16 (Slave 2) (i.e., (32 GB+32 GB) is subtracted from "32 GB+32 GB+1 B"). "Length of payload" is regarded as one obtained by subtracting, from the original length of the payload, a length from a start address to a terminal address in Master 2 and a length from the start address to the terminal address in Slave 1 (i.e., 32 GB).

First memory device 12 (Master 2) only receives (i.e., performs reading for the address without dividing a command) a part, which is directed to first memory device 12 (Master 2) itself (i.e., the address is directed to Master 2 itself), of the command that is received by first memory device 12 (Master 2) and that is used for the reading processing. However, only reading is performed for data having a length from its start address to its terminal address.

The data read from second memory device 14 (Slave 1) is, as described above, returned to root complex 6 as data read from the master memory (via the master memory).

The data read from third memory device 16 (Slave 2) is, as described above, returned to root complex 6 as data read from the master memory (via the master memory).

After all data has been read, the reading processing ends (S50). At end of the reading processing, first memory device 12 (Master 2) may return the bus master to root complex 6 (Master 1).

2.3. Effects and Others

As described above, in the present exemplary embodiment, the information processing device serving as a PCIe system includes the host device and the plurality of memory devices. The host device includes the root complex. The plurality of memory devices respectively correspond to the end points. One of the plurality of memory devices is defined as a master memory. The other memory devices are defined as slave memories, and logically coupled to the master memory.

The plurality of memory devices thus constitute a virtual storage. When accessing is performed from the root complex to the plurality of memory devices constituting the single virtual storage, the root complex hands over a bus master to the master memory. The master memory handed over with the bus master and received with a command regarding the accessing from the root complex changes, in the command regarding the accessing, address information used for the accessing, based on a logical relationship with the slave memories, and sends the changed command regarding the accessing to a part or all of the slave memories.

The information processing device can thus utilize the single virtual large-capacity storage configured based on the plurality of memory devices to collectively handle large-sized data such as image data recorded for a long period of time.

3. Other Exemplary Embodiments

As described above, the first exemplary embodiment has been described as an example of the technique disclosed in the present application. However, the technique of the present disclosure is not limited to the exemplary embodiment, and also applicable to other exemplary embodiments that undergo modifications, replacements, additions, and omissions, for example, as appropriate.

To describe the exemplary embodiment, the drawings and the detailed description are provided. Therefore, the components illustrated in the accompanying drawings and described in the detailed description may include components essential for solving the problems, as well as components that are not essential for solving the problems but required to exemplify the above technique. For this reason, it should not be immediately deemed that those unessential components are essential just because those unessential components are described in the accompanying drawings and the detailed description.

Each exemplary embodiment described above is provided to exemplify the technique according to the present disclosure. Therefore, it is possible to make various changes, replacements, additions, omissions, and the like within the scope of the claims and equivalents thereof.

INDUSTRIAL APPLICABILITY

The present disclosure is applicable to an information processing device to be attached with a plurality of removable media. Specifically, the present disclosure is applicable to a video server, for example.

REFERENCE MARKS IN THE DRAWINGS

4: CPU
6: root complex
6a: information storage unit
12: first end point (first memory device)
12a: first information storage unit
14: second end point (second memory device)
14a: second information storage unit
16: third end point (third memory device)
16a: third information storage unit
20: host device
22: PCIe bus

The invention claimed is:

1. An information processing device serving as a PCI Express (PCIe) system, the information processing device comprising
a host device including a root complex; and
a plurality of memory devices respectively corresponding to end points, wherein
one of the plurality of memory devices is defined as a master memory, the other memory devices are defined as slave memories, and are logically coupled to the master memory, and the plurality of memory devices constitute a single virtual storage,
when accessing is performed from the root complex to the plurality of memory devices constituting the single virtual storage, the root complex hands over a bus master to the master memory, and
the master memory receives a command regarding the accessing from the root complex, changes address information used for the accessing in the command regarding the accessing, based on a logical relationship with the slave memories, and sends changed command regarding the accessing to a part or all of the slave memories.

2. The information processing device according to claim 1, wherein
the root complex causes an information storage unit included in the root complex to store the command regarding the accessing, and then hands over the bus master to the master memory, and
the master memory handed over with the bus master reads the command regarding the accessing, the command being stored in the information storage unit included in the root complex, to receive the command regarding the accessing from the root complex.

3. The information processing device according to claim 1, wherein the memory devices store information regarding whether a function to be able to be served as a master memory is provided and information regarding capacity.

4. The information processing device according to claim 1, wherein, after the bus master is handed over from the root complex, and data is written or read, the master memory returns the bus master to the root complex.

* * * * *